March 8, 1955  J. H. KLEBANOFF  2,703,413
BABY CRIB FOR AUTOS
Filed Jan. 19, 1953
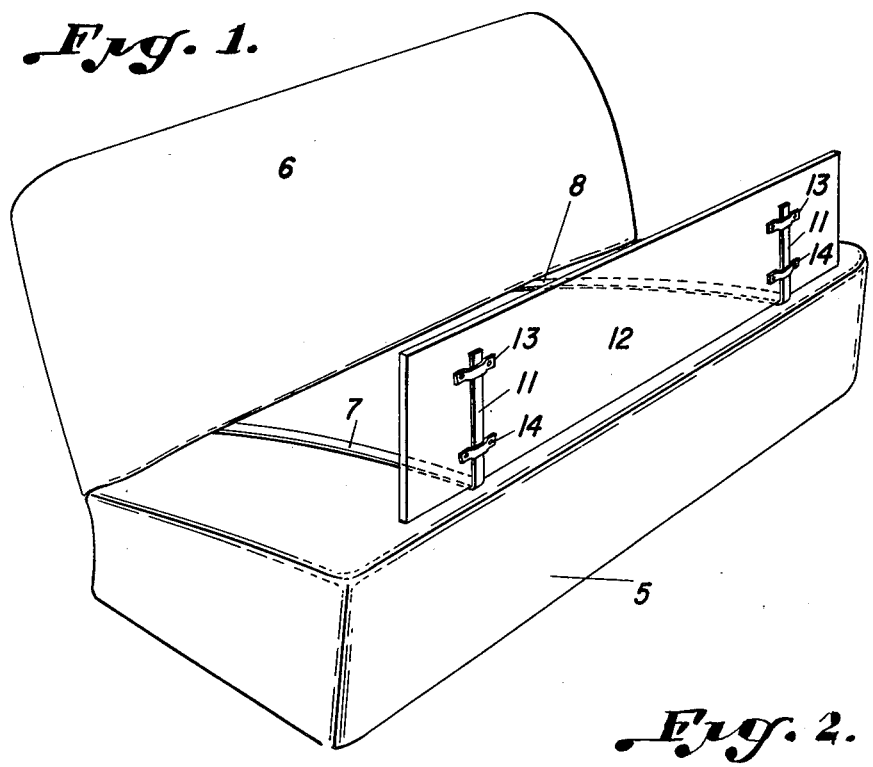
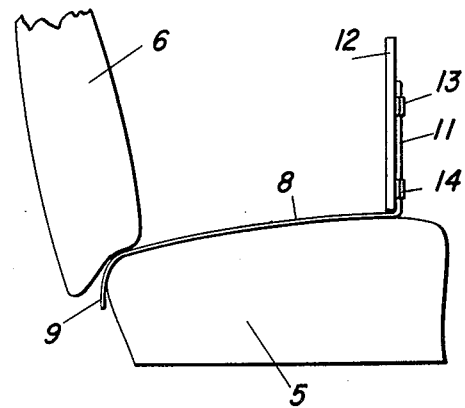
INVENTOR.
Jake H. Klebanoff
BY
Att'y

United States Patent Office 2,703,413
Patented Mar. 8, 1955

2,703,413

BABY CRIB FOR AUTOS

Jake H. Klebanoff, San Francisco, Calif.

Application January 19, 1953, Serial No. 331,783

1 Claim. (Cl. 5—94)

This invention relates to improvements in baby cribs for automobiles.

The principal object of this invention is to provide means for retaining a reclining child on the rear seat of a motor vehicle.

A further object of this invention is to provide an economical structure which may be readily applied to any standard form of automobile rear seat.

A further object is to produce a device of the character described which may be readily disassembled so as to occupy a minimum amount of space when not in use.

A further object is to produce a device of this character which is easy to apply and one which is neat in appearance.

Other objects and advantages will be apparent during the course of the following description.

In the accompanying drawings forming a part of this specification and in which like numbers are employed to designate like parts throughout the same:

Fig. 1 is a perspective view of the rear seat of a vehicle having my invention applied thereto; and Fig. 2 is a side elevation of Fig. 1.

In carrying small children, particularly infants in automobiles, it is often desirable to place them on the rear seat of the vehicle, but unless they are enclosed in a basket or other crib-like arrangement, they are likely to fall off of the seat, particularly if the operator makes a sudden stop. Also, such arrangements occupy a great deal of space and cannot be folded for storage when not in use.

Applicant has therefore devised a very simple arrangement which may be quickly assembled and positioned and later removed and stored.

In the accompanying drawings, wherein for the purpose of illustration is shown a preferred embodiment of my invention, the numeral 5 designates the rear seat of a motor vehicle and the numeral 6, the back thereof.

My invention consists in a pair of bent members 7 and 8 having their ends bent in opposite directions, as shown in 9 and 11 in Fig. 2.

As both of these members are identical, the same numerals apply thereto.

The upturned ends 11 are secured to a board 12 through the medium of straps 13 and 14, which straps are slidable on the upturned ends and as a result when the parts are assembled as shown in Fig. 1, the board 12 acts as a stop so that when the child is laid upon the seat cushion 5, any tendency to roll off the seat will be prevented by the board, thus forming a crib-like enclosure where the child can lie in safety.

As soon as the device is not any longer needed, the board 12 may be removed and then the members 7 and 8 may be removed from their engagement between the back and the seat and the entire structure stored in any convenient place.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a crib attachment for an automobile seat having a seat portion and a back, a pair of strap-like members, each having one end downwardly curved for placement beneath the lower edge of the seat back and rearwardly of the seat, the forward end of each member extending upwardly and substantially normal to the plane of the major portion of the member intermediate the ends of the member and located adjacent the forward edge of the seat and a board having on one face a pair of guide straps adjacent each end to receive the upwardly extending end of the adjacent member.

References Cited in the file of this patent

UNITED STATES PATENTS

| Number | Name | Date |
|---|---|---|
| 807,360 | Coyle | Dec. 12, 1905 |
| 1,912,514 | Curtis | June 6, 1933 |
| 1,915,774 | Busch | June 27, 1933 |
| 2,048,955 | Showalter | July 28, 1936 |
| 2,322,403 | Van Der Kieft | June 22, 1943 |
| 2,369,552 | Ferran | Feb. 13, 1945 |
| 2,532,007 | Biasell | Nov. 28, 1950 |
| 2,563,922 | Collins | Aug. 14, 1951 |